(12) United States Patent
Hernandez-Gonzalez

(10) Patent No.: US 12,228,073 B2
(45) Date of Patent: Feb. 18, 2025

(54) RECIRCULATION FAN TURBOCHARGER ASSEMBLY AND FUEL CELL SYSTEM

(71) Applicant: BorgWarner Inc., Auburn Hills, MI (US)

(72) Inventor: Vincent Hernandez-Gonzalez, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/441,122

(22) Filed: Feb. 14, 2024

(65) Prior Publication Data

US 2024/0183308 A1 Jun. 6, 2024

Related U.S. Application Data

(62) Division of application No. 18/098,795, filed on Jan. 19, 2023, now abandoned.

(30) Foreign Application Priority Data

Jun. 13, 2022 (DE) .......................... 102022114838.6

(51) Int. Cl.
*F02C 6/12* (2006.01)
*F02C 7/04* (2006.01)
*H01M 8/04089* (2016.01)

(52) U.S. Cl.
CPC .................. *F02C 6/12* (2013.01); *F02C 7/04* (2013.01); *H01M 8/04097* (2013.01); *F05D 2220/40* (2013.01); *H01M 2250/20* (2013.01)

(58) Field of Classification Search
CPC ......... F02C 6/12; F02C 7/04; H01M 8/04097; H01M 2250/20; F05D 2220/40
See application file for complete search history.

(56) References Cited

U.S. PATENT DOCUMENTS

| 2005/0266293 A1* | 12/2005 | Delzanno | F01D 15/02 429/513 |
| 2008/0187796 A1 | 8/2008 | Rainville et al. | |
| 2019/0145416 A1* | 5/2019 | Donato | F04D 25/024 415/100 |
| 2023/0399976 A1 | 12/2023 | Hernandez-Gonzalez | |

* cited by examiner

*Primary Examiner* — J. Todd Newton
(74) *Attorney, Agent, or Firm* — Howard & Howard Attorneys PLLC

(57) ABSTRACT

A recirculation fan turbocharger assembly (23) recycles hydrogen and supplies air in a fuel cell system. The assembly (23) includes a fan (25), a compressor (27), and an electric drive (31) and/or a turbine (29). The fan (25) has an impeller (255) which is designed to convey a hydrogen containing recycle stream (250) to a fuel cell unit (1). The compressor (27) has a compressor wheel (275) which is designed to compress an air stream (270) for a fuel cell unit. The compressor wheel (275) and the impeller (255) are coupled to one another in a rotationally fixed manner. The electric drive (31) and/or a turbine (29) is/are designed to drive the impeller (255) and the compressor wheel (275) simultaneously.

10 Claims, 5 Drawing Sheets

RECIRCULATION FAN TURBOCHARGER ASSEMBLY AND FUEL CELL SYSTEM

CROSS-REFERENCE TO RELATED APPLICATIONS

This application is a Divisional Application claiming priority to U.S. Non-Provisional application Ser. No. 18/098,795, filed Jan. 19, 2023, which claims priority pursuant to 35 U.S.C. 119 (a) to German Patent Application No. 102022114838.6 filed Jun. 13, 2022, which applications are incorporated herein by reference in their entirety.

BACKGROUND

The invention relates to a recirculation fan turbocharger assembly for recycling hydrogen and supplying air in a fuel cell system The invention further relates to a fuel cell system comprising a recirculation fan turbocharger assembly of this type.

A fuel cell system can be provided in a vehicle, for example a car, a train, an aircraft or a ship. Electrical energy is generated in the fuel cell system for example by hydrogen to drive the vehicle.

The fuel cell system comprises a fuel cell unit which is supplied with gaseous hydrogen. To supply fresh air, the oxygen of which reacts with the hydrogen, a turbocharger can be provided. Optionally, unused hydrogen gas is recycled to the inlet of the fuel cell unit. In the recycling, a recirculation fan is provided to return the unused hydrogen gas to the inlet and to ventilate the fuel cell. This means that lower fuel consumption can be achieved.

The recirculation fan can be in the form of an electrically powered compressor, for example a centrifugal compressor. Side channel compressors and rotary blowers, known as Roots blowers, having a relatively low desired pressure ratio, are also used.

SUMMARY

The object of the invention is to indicate an alternative approach for recovering hydrogen in a fuel cell system.

The object is achieved by a recirculation fan turbocharger assembly for recycling hydrogen and supplying air in a fuel cell system having the features from claim 1.

The recirculation fan turbocharger assembly comprises a fan having an impeller which is designed to convey a hydrogen containing recycle stream to a fuel cell unit, and a compressor having a compressor wheel which is designed to compress an air stream for a fuel cell unit, wherein the compressor wheel and the impeller are coupled to one another in a rotationally fixed manner. An electric drive and/or a turbine is/are designed to drive the impeller and the compressor wheel simultaneously.

In the recirculation fan turbocharger assembly, both a fan for transporting the unused hydrogen back to the fuel cell unit and a compressor as a turbocharger for supplying compressed fresh air to the fuel cell unit are provided. Advantageously, the fan also acts as a compressor for the hydrogen containing recycle stream. The compressor conveys the compressed fresh air to the fuel cell unit. In one embodiment, the impeller and the compressor wheel are coupled in such a way that they are driven by an electric drive simultaneously; a turbine is not provided. Alternatively, the impeller and the compressor wheel are coupled in such a way that they are driven by the turbine simultaneously and are advantageously assisted by an electric drive so that sufficient drive torque is provided for the fan and the compressor. The turbine can be driven by a fuel cell exhaust gas stream from the fuel cell unit which substantially comprises water vapor. The fuel cell exhaust gas stream and the hydrogen containing recycle stream are guided to two outlets of the fuel cell unit and are separated from one another by the recirculation fan turbocharger assembly.

The recirculation fan turbocharger assembly integrates a recirculation fan and a turbocharger for a fuel cell unit in one device. This is a new approach for providing a hydrogen recirculation fan which increases the efficiency and service life of fuel cell systems for all types of fuel cell electric vehicles, for example cars, trains, aircraft or ships.

The recirculation fan turbocharger assembly expands the function range of a conventional electrically assisted fuel cell turbocharger comprising a compressor for supplying suction air, and a turbine which drives the compressor by means of an exhaust gas stream. In the recirculation fan turbocharger assembly, the recirculation fan is integrated in a turbocharger system, the construction of which is already ready to use and tested and on which the design can build during the integration of the recirculation fan and the related adaptation of the turbocharger. The recirculation fan turbocharger assembly can be based on an only electrically powered turbocharger or an electrically assisted turbine powered turbocharger. In the recirculation fan turbocharger assembly, the electric drive or the turbine drive assisted by an electric drive is additionally used to convey, and advantageously compress, the hydrogen to be returned. This results in potential cost and space savings.

The compressor wheel and impeller can be coupled by means of a shaft, wherein the electric drive is coupled to the shaft between the compressor wheel and the impeller so that the compressor wheel and impeller are arranged on the end regions of the shaft. The electric drive comprises an electric motor which is arranged between the compressor wheel and the impeller and drives the shaft. Such a shaft can be held by oil free air bearings. In this embodiment, no turbine is provided, since the driving takes place only electrically.

In an alternative embodiment, a turbine is provided. The shaft is coupled to the compressor wheel, the impeller and the turbine wheel, and an electric drive is coupled to the shaft between two of the compressor wheel, the impeller and the turbine wheel so that wheels are provided on both end regions of the shaft. Such a shaft can be held by oil free air bearings. The fan, the compressor, the turbine and the electric motor, which is part of the electric drive, can be arranged in different orders. The electric motor has a rotatable magnetic region and a stationary magnetic region, wherein the rotatable magnetic region is arranged on the shaft. An electric motor of this type can be for example a three phase permanent magnet motor, the control circuit of which comprises a three phase inverter, which is operated with at least 48V.

In one embodiment, an electric motor is arranged between the turbine wheel and the compressor wheel and is coupled to the shaft. In this arrangement of the turbine wheel and the compressor wheel, similarly to in a conventional electrically assisted turbocharger, the recirculation fan is arranged on the same shaft as an additional, external compressor stage, advantageously on the side of the turbine facing away from the electric motor, so that the compressor and fan are arranged externally.

In an alternative arrangement, an electric motor is arranged between the turbine wheel and the impeller, and the compressor wheel is arranged on the side of the impeller facing away from the electric motor.

In one embodiment, an electric motor is arranged between the compressor wheel and the impeller and is coupled to the shaft, wherein the turbine wheel is arranged on the side of the impeller facing away from the electric motor. Advantageously, the impeller and the turbine wheel turn the backs thereof to one another, which is also referred to as a back-to-back arrangement. This arrangement makes it easier to supply the incoming gas streams and is associated with a compact construction.

In other embodiments as well, two adjacent wheels can turn the backs thereof to one another.

In one embodiment, a housing of the recirculation fan turbocharger assembly comprises a fan housing, a compressor housing and a turbine housing and is designed in such a way that the hydrogen containing recycle stream, the air stream and the fuel cell exhaust gas stream flow through the housing spatially separately from one another. The spatial separation of the gas streams is achieved by the housing design and seals.

In one embodiment without a turbine, the fan housing and the compressor housing are designed in such a way that the hydrogen containing recycle stream and the air stream flow through the housing spatially separately from one another.

A fuel cell system comprises a recirculation fan turbocharger assembly and a fuel cell unit which are coupled to one another in such a way that hydrogen from the fuel cell unit can be conveyed back through the fan to the fuel cell unit, and an air stream is supplied through the compressor of the fuel cell unit. The recirculation fan turbocharger assembly fulfills a dual function: recycling hydrogen and supplying air, which is associated with a compact design of the recirculation fan turbocharger assembly and thus also of the fuel cell system.

In one embodiment of the fuel cell system, the fan has a fan inlet and a fan outlet, and the compressor has a compressor inlet for the inflow of air and a compressor outlet. The fuel cell unit is coupled on the output side to the fan inlet and on the input side to the fan outlet and the compressor outlet. The coupling can take place by means of additional components, for example valves. In this embodiment, a turbine is not required.

In an alternative embodiment of the fuel cell system, the fan has a fan inlet and a fan outlet. The compressor has a compressor inlet for the inflow of air and a compressor outlet, and the turbine has a turbine inlet and a turbine outlet. The fuel cell unit is coupled on the output side to the turbine inlet and the fan inlet, and on the input side to the fan outlet and the compressor outlet. The coupling can take place by means of additional components, for example valves. In this embodiment, a turbine drive is provided, which is advantageously electrically assisted by the electric drive, which results in a reduction in power consumption by comparison with an embodiment without a turbine. The turbine is driven by the fuel cell exhaust gas stream, and the fan conveys the hydrogen containing recycle stream.

BRIEF DESCRIPTION OF THE DRAWINGS

In the following, some exemplary embodiments will be described in greater detail with reference to the drawings, in which.

Figure 1:
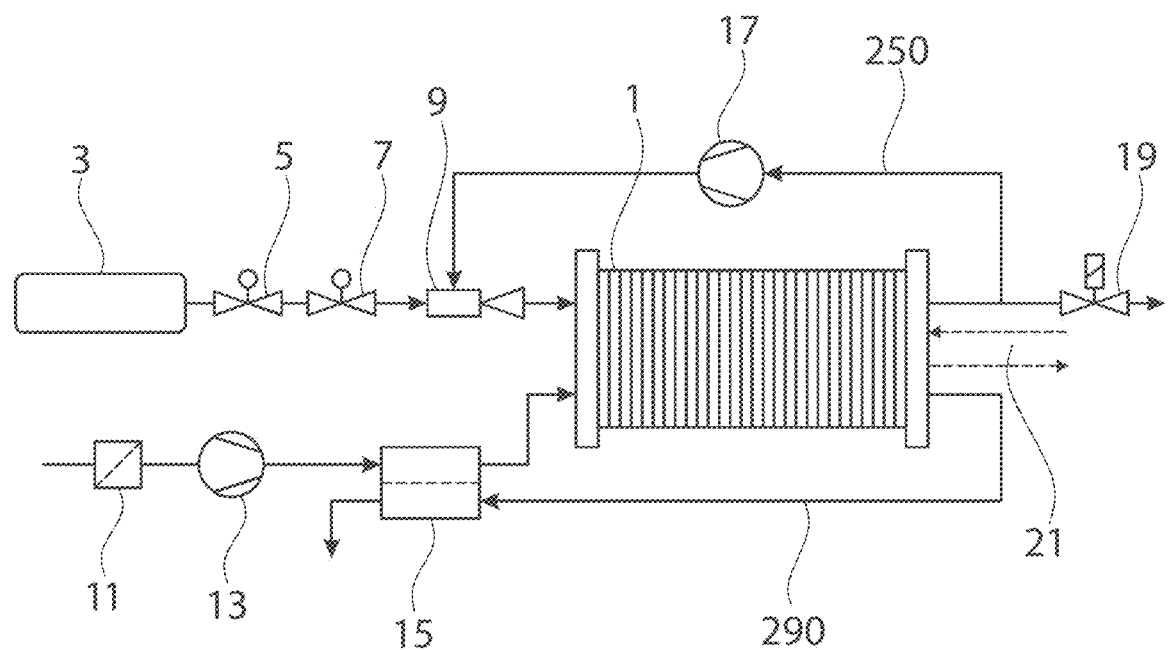
FIG. 1 schematically shows an exemplary embodiment of a conventional fuel cell system.

In the drawings, like or functionally like components are provided with the same reference signs.

DETAILED DESCRIPTION

FIG. 1 schematically shows an exemplary embodiment of a conventional fuel cell system having a fuel cell unit 1, which comprises a stack having a plurality of fuel cells. The fuel cells each have an anode and a cathode, and a membrane arranged therebetween. On the anode side, a fuel, in this exemplary embodiment gaseous hydrogen, is supplied. The supply takes place from a hydrogen reservoir 3 in the form of a tank via a pressure reducer 5 and a pressure control valve 7 connected downstream of the pressure reducer 5. Hydrogen from the pressure reducing valve 7 and hydrogen recycled from the fuel cell unit 1 are supplied to the anode side of the fuel cell unit 1 via an ejector 9. To the cathode side, an oxidation means, conventionally air, is supplied. This supply takes place via a filter 11 and an air compressor 13. The compressed air passes through a humidifier 15 to improve the efficiency and is supplied to the cathode side of the fuel cell unit 1.

The fuel and the oxidation means react inside the fuel cells and release energy while simultaneously producing water. The gaseous water is the output side fuel cell exhaust gas stream 290 at the cathode. However, hydrogen which flows out of the hydrogen reservoir 3 into the anode side is conventionally not completely converted into water. Nitrogen and water which are formed during the reaction in the anode and would increasingly impair the efficiency are discharged from the fuel cell unit 1 to make space for hydrogen. As a result, an efficient reaction is made possible, and the sensitive membrane in the fuel cells is not damaged, and therefore the fuel cell system 1 functions well even when it is cold and has a long service life. As a result of the points mentioned above, a recycling circuit for a hydrogen containing recycle stream 250 is provided with a recirculation fan 17 in the hydrogen recycle and a discharge valve 19 at the anode. A recirculation fan 17 increases the efficiency and the robustness of the system, in particular with respect to protection when it is cold and the service life. At the anode, a separate recycling circuit is provided with the recirculation fan 17, which recycles the unused hydrogen and blows the nitrogen and the excess water out of the cell. The recycling circuit firstly feeds the unused hydrogen back into the anode input and secondly discharges the nitrogen and the excess water through the discharge valve 19. The water is guided to the humidifier 15 in order to humidify the input air.

Cooling connections 21 of the fuel cell unit 1 are connected to a cooling system to cool the fuel cell unit 1.

Figure 2:
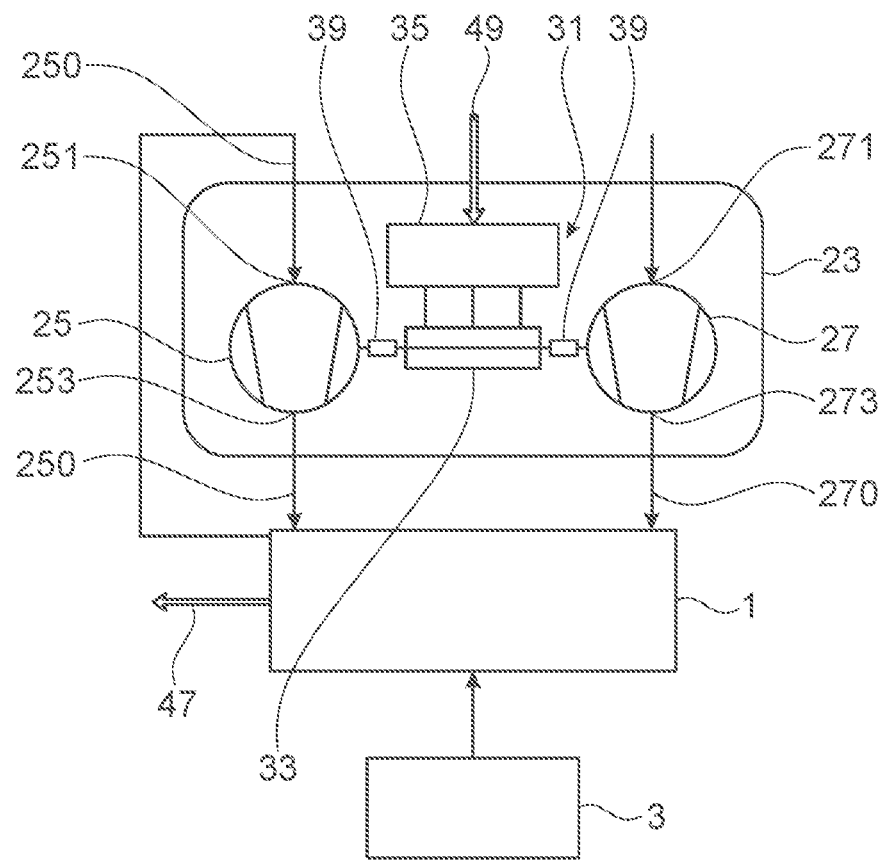
FIG. 2 schematically shows an exemplary embodiment of a fuel cell system.

FIG. 2 schematically shows an exemplary embodiment of a fuel cell system.

The fuel cell system comprises a fuel cell unit 1 which is coupled on the input side to a hydrogen reservoir 3, from which hydrogen is conducted as fuel into the fuel cell unit 1. The coupling can take place by means of additional components, for example valves.

The fuel cell unit 1 is coupled to a recirculation fan turbocharger assembly 23 which both supplies air to the fuel cell unit 1 and recycles unused hydrogen into the fuel cell unit 1. In the fuel cell unit 1, the reaction of hydrogen and oxygen from the supplied air brings about a conversion of the chemical energy from hydrogen and oxygen into electrical energy, the power output 47 of which is illustrated by an arrow.

The recirculation fan turbocharger assembly 23 comprises a fan 25 which is designed to convey, and in the process compress, a hydrogen containing recycle stream 250, and a compressor 27, which is designed to compress and convey an air stream 270 for the fuel cell unit 1. An electric drive 31 drives the fan 25 and the compressor 27 jointly.

The fan 250 comprises a fan inlet 251, a fan outlet 253 and an impeller 255. The compressor 27 comprises a compressor inlet 271, a compressor outlet 273 and a compressor wheel 275. On the input side, the fuel cell unit 1 is coupled to the compressor outlet 273, via which compressed air is supplied, and the fan outlet 253, via which unused hydrogen is made available again. On the output side, the fuel cell unit 1 is coupled to the fan inlet 251 so that unused hydrogen flows out of the fuel cell unit 1 into the fan 25. Air is guided to the compressor 27 via the compressor inlet 271.

The housing of the recirculation fan turbocharger assembly 23 comprises a fan housing and a compressor housing which are designed in such a way that the hydrogen containing recycle stream 250 and the air stream 270 flow through the housing spatially separately from one another, without mixing.

The electric drive 31 is coupled between the fan 25 and the compressor 27 and comprises an electric motor 33 which drives both the compressor wheel 275 in the compressor 27 and the impeller 255 in the fan 25 so that air is conveyed to the fuel cell unit 1, and hydrogen is conveyed back to the fuel cell unit 1. The electric motor 33 can be in the form of a three phase permanent magnet motor. A control circuit 35 controls the electric motor 33 and is coupled to an electrical supply 49. The power supply of the electric motor 33 also takes place via the control circuit 35.

Figure 3:
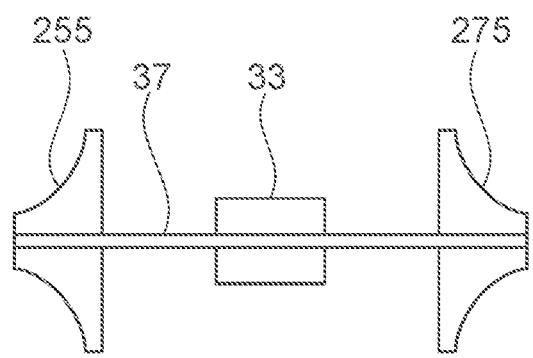
FIG. 3 schematically shows a rotor having an electric motor from the recirculation fan turbocharger assembly from FIG. 2, FIG. 4 schematically shows another exemplary embodiment of a fuel cell system.

FIG. 3 schematically shows a rotor from the recirculation fan turbocharger assembly 23 from FIG. 2. The rotor comprises the rotatable components of the recirculation fan turbocharger assembly 23.

The rotor comprises the impeller 255 and the compressor wheel 275, which are coupled to one another in a rotationally fixed manner by means of a shaft 37. The shaft 37 is driven by the electric motor 33 and held by bearings 39. The electric motor 33 is arranged between the impeller 255 and the compressor wheel 275. The electric motor 33 is coupled to the shaft 37 so that the shaft can be driven by the electric motor 33. The impeller 255 and the compressor wheel 275 rotate at the same speed. However, because these have different designs, in particular different sizes, the performances thereof can be different and adapted to the operating requirements.

Figure 4:
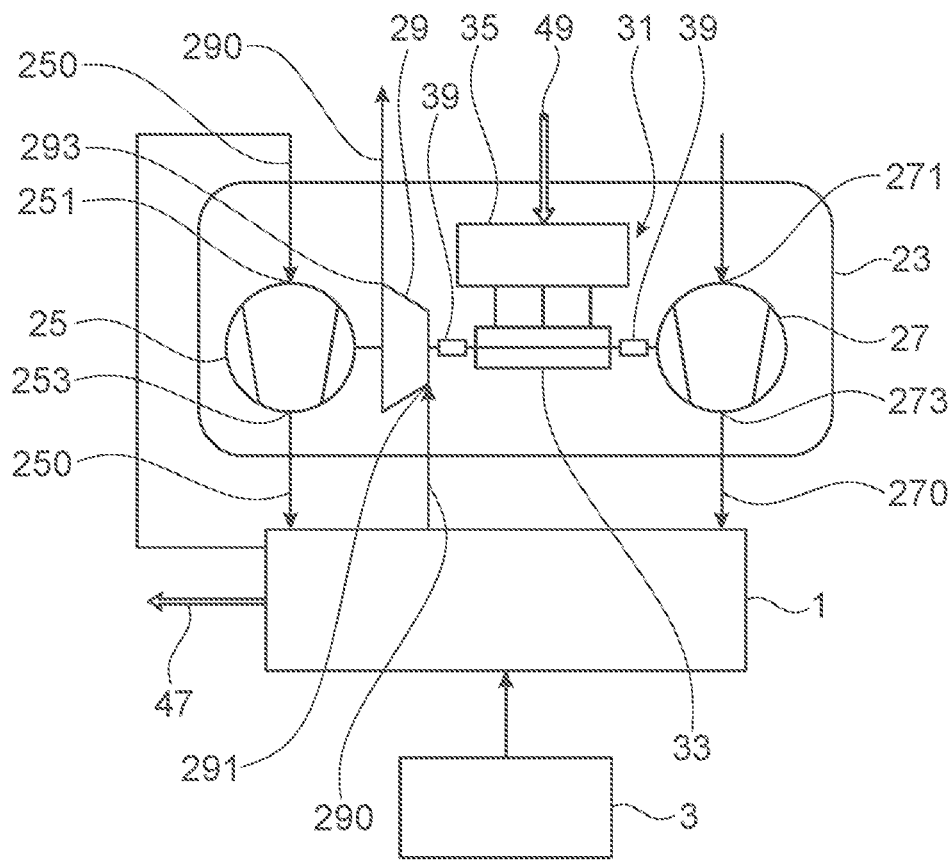

FIG. 4 schematically shows another exemplary embodiment of a fuel cell system.

The fuel cell system comprises a fuel cell unit 1 which is coupled on the input side to a hydrogen reservoir 3, from which hydrogen is conducted as fuel into the fuel cell unit 1.

The fuel cell unit 1 is coupled to a recirculation fan turbocharger assembly 23 which both supplies compressed air to the fuel cell unit 1 and conveys unused hydrogen back into the fuel cell unit 1. A fuel cell exhaust gas stream 290 substantially comprising water vapor, but also oxygen, is guided through the recirculation fan turbocharger assembly 23 in order to drive the air supply and hydrogen recycling. A hydrogen containing recycle stream 250, which is also provided on the output side of the fuel cell unit 1, is conveyed by the recirculation fan turbocharger assembly 23 back to the input of the fuel cell unit 1.

The recirculation fan turbocharger assembly 23 comprises a fan 25 which is designed to convey a hydrogen containing recycle stream 250, and a compressor 27, which is designed to compress an air stream 270 for the fuel cell unit 1. A turbine 29 is coupled to the fan 25 and the compressor 29 so that the turbine drives the fan 25 and the compressor 27 simultaneously. The turbine 29 can be driven by the fuel cell exhaust gas stream 290. An electric drive 31, which can drive the fan 25 and the compressor 27 jointly, is provided to assist the turbine drive.

The fan 25 comprises a fan inlet 251, a fan outlet 253 and an impeller 255. The compressor 27 comprises a compressor inlet 271, a compressor outlet 273 and a compressor wheel 275. The turbine 29 comprises a turbine inlet 291, a turbine outlet 293 and a turbine wheel 295. On the input side, the fuel cell unit 1 is coupled to the compressor outlet 273, from which compressed air is supplied, and the fan outlet 253, from which hydrogen is recycled. On the output side, the fuel cell unit 1 is coupled to the fan inlet 251, into which the hydrogen containing recycle stream 250 flows, and to the turbine inlet 291 so that the fuel cell exhaust gas stream 290 drives the turbine wheel 295. Via the compressor inlet 271, air is guided to the compressor 27, compressed therein and then flows into the fuel cell unit 1.

The electric drive comprises an electric motor 33 which is designed to drive both the compressor wheel 275 in the compressor 27 and the impeller 255 in the fan 25 so that air is conveyed to the fuel cell unit 1, and hydrogen is conveyed back to the fuel cell unit 1. A control circuit 35 controls the electric motor 33. The power supply of the electric motor 33 also takes place via the control circuit 35. The electric motor 33 is designed to assist the turbine drive. The electric motor 33 can be controlled by the control circuit 35 according to the amount of fuel cell exhaust gas that flows into the turbine 29, and the desired power of the fan 25 and the compressor 27.

Figure 5:
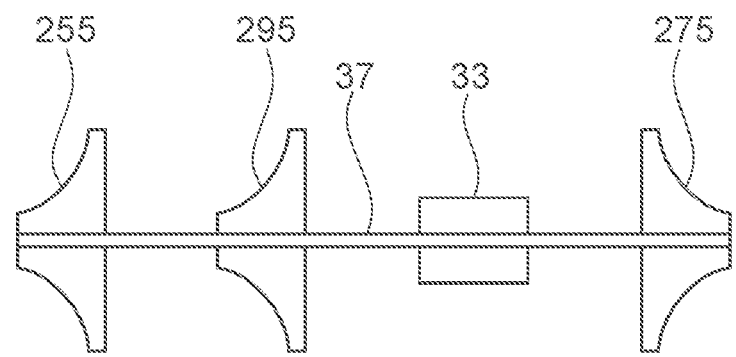
FIG. 5 schematically shows a rotor having an electric motor from the recirculation fan turbocharger assembly from FIG. 4.

FIG. 5 schematically shows a rotor from the recirculation fan turbocharger assembly from FIG. 4.

The rotor comprises the impeller 255, the compressor wheel 275 and the turbine wheel 295, which are coupled to one another in a rotationally fixed manner by means of a shaft 37. The shaft 37 is driven by the electric motor 33 and/or the turbine 29. The electric motor 33 is arranged between the turbine wheel 295 and the compressor wheel 275, and the electric motor 33 is coupled to the shaft 37 so that the shaft can be driven by the electric motor 33. The impeller 255 is arranged on the side of the turbine 29 facing away from the electric motor 33.

Although the impeller 255, the compressor wheel 275 and the turbine wheel 295 are coupled by means of the shaft 37, the gas streams are separated from one another by the fan 25, the compressor 27 and the turbine 29. This is achieved inter alia by the design of the housing of the recirculation fan turbocharger assembly 23 and seals.

In the case of the above-described recirculation fan turbocharger assembly 23, the compressor 27 and the turbine 29 are arranged similarly to in a conventional turbocharger but extended by the fan 25 on the outer side of the turbine 29.

As a result of the rotationally fixed coupling of the turbine wheel 29, the compressor wheel 27 and the impeller 25, the above-described assembly is associated with a simple construction, but the wheels have the same rotational speed. An adaptation to the power requirements of the fan 25, the compressor 27, and the turbine 29 can take place by means of different wheel designs, as well as by the design of the flow path inside the fan 25, the compressor 27 and the turbine 29.

Figure 6:
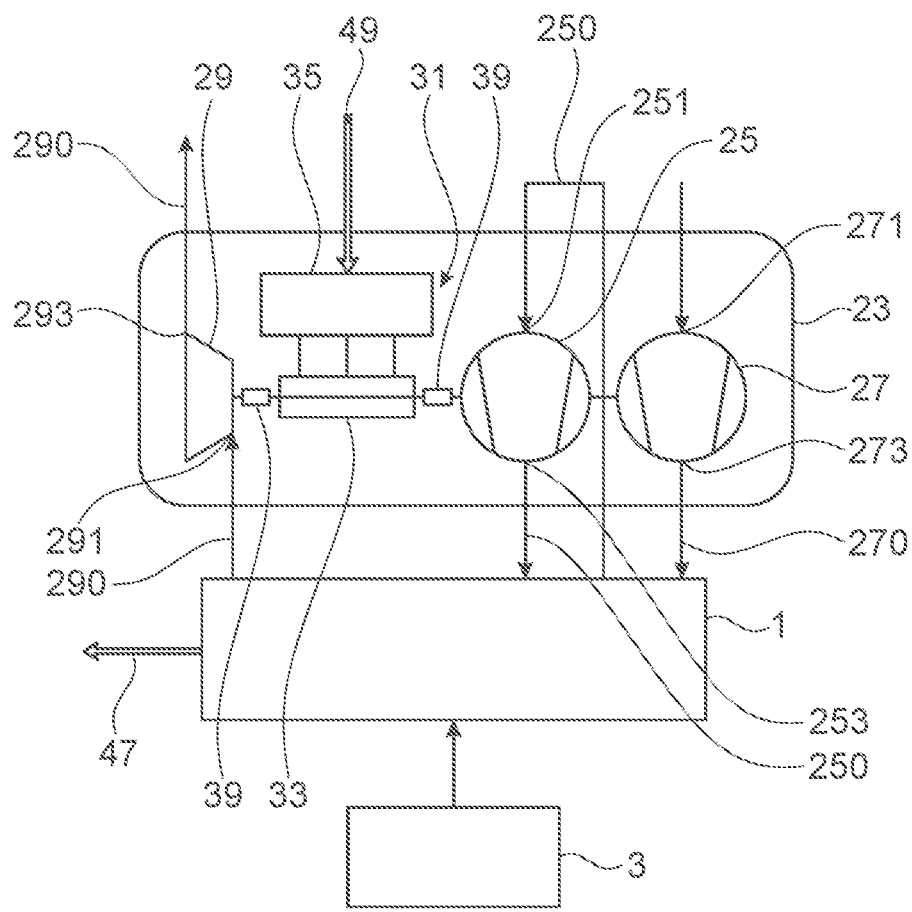
FIG. 6 schematically shows yet another exemplary embodiment of a fuel cell system.

FIG. 6 schematically shows another exemplary embodiment of a fuel cell system. The description is focused on differences from the previous exemplary embodiment.

In this exemplary embodiment, the fan 25 and the compressor 27 are arranged on one side of the electric motor 33, and the turbine 29 is arranged on the other side. The fan 25 is arranged between the electric motor 33 and the compressor 27. In an alternative exemplary embodiment, the fan 25 and the compressor 27 can be arranged the other way around.

Figure 7:
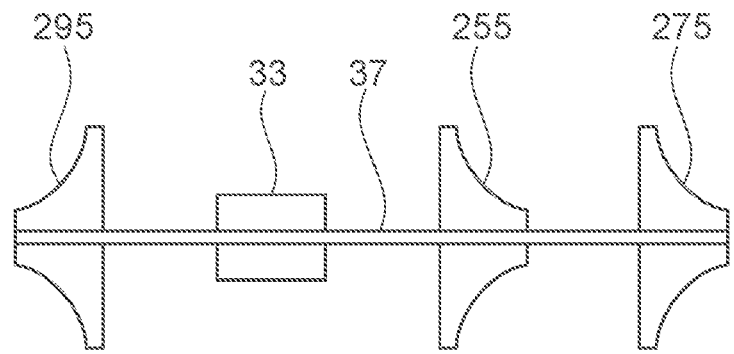
FIG. 7 schematically shows a rotor having an electric motor from the recirculation fan turbocharger assembly from FIG. 6.

FIG. 7 schematically shows a rotor from the recirculation fan turbocharger assembly 23 from FIG. 6.

The rotor comprises the impeller 255, the compressor wheel 275 and the turbine wheel 295, which are coupled to one another in a rotationally fixed manner by means of a shaft 37. The shaft 37 is driven by the electric motor 33 and/or the turbine 29. The electric motor 33 is arranged between the turbine wheel 295 and the impeller 255. On the side of the impeller 255 facing away from the electric motor 33, the compressor wheel 275 is arranged.

Figure 8:
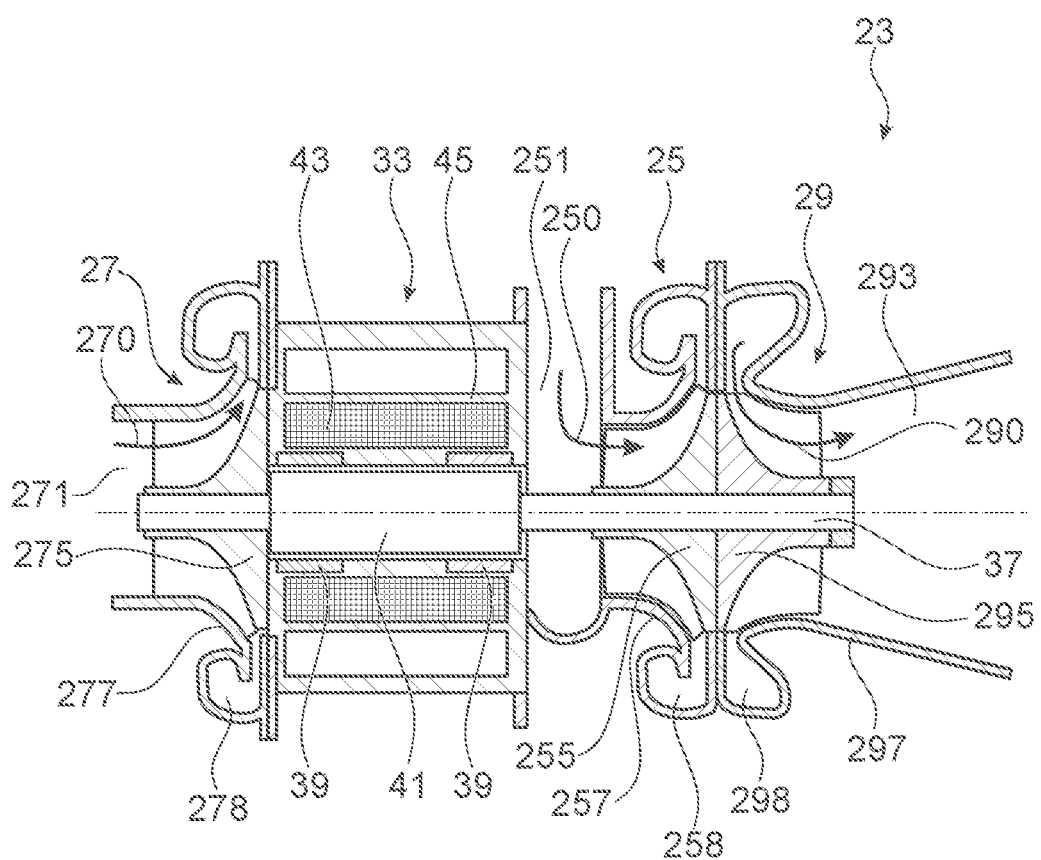
FIG. 8 is a sectional view through an exemplary embodiment of a recirculation fan turbocharger assembly.

FIG. 8 is a sectional view through an exemplary embodiment of a recirculation fan turbocharger assembly 23. As in the two above-described exemplary embodiments, the assembly can be coupled to a fuel cell unit 1.

The recirculation fan turbocharger assembly 23 comprises a fan 25 which is designed to convey a hydrogen containing recycle stream 250, and a compressor 27, which is designed to compress an air stream 270 for a fuel cell unit 1. A turbine 29 is coupled to the fan 25 and the compressor 27 so that the turbine drives the fan 25 and the compressor 27 simultaneously. The turbine 29 can be driven by the fuel cell exhaust gas stream 290. The electric motor 33 is provided to assist the turbine drive.

The compressor 27 and the turbine 29 are arranged on the outer sides. The electric motor 33 is arranged between the compressor 27 and the fan 25.

The compressor 27 comprises an axial compressor inlet 271, a compressor outlet 273 and a compressor wheel 275 which is arranged in a compressor housing 277. The compressor wheel 275 is coupled to a shaft 37. Between the compressor outlet 273 and the compressor wheel 275, the compressed air stream 270 passes through a volute 278 which extends helically around the compressor wheel 275.

The electric motor 33 is arranged between the compressor 27 and the fan 25 and coupled to the shaft 37 so that the shaft can be driven by the electric motor 33. The electric motor 33 comprises a magnetic region 41 on the shaft 37, which is in the form of a permanent magnetic sleeve. Around the magnetic region 41, magnetic regions 43 of a stator 45 are arranged, which are in the form of coils having windings through which a current that varies over time flows. According to the current varying over time and flowing through the windings, a magnetic field that varies over time is induced, which, together with the permanent magnetic sleeve, brings about a rotation of the rotor and thus of the shaft 37. Oil free bearings 39 hold the shaft 37.

The fan 25, in the form of a radial fan, comprises a fan inlet 251, a fan outlet 253 and an impeller 255 which is arranged in a fan housing 257 and is coupled to the shaft 37. The recycled hydrogen flows through the fan inlet 251, which extends adjacently to the electric motor 33, firstly radially in the direction of the axis of rotation and then axially to the impeller 255 and subsequently passes through a volute 258, which extends helically around the impeller 255, before the hydrogen containing recycle stream 250 leaves the fan 25 through the fan outlet 253.

The fan 29 comprises a turbine inlet 291, a turbine outlet 293 and a turbine wheel 295 which is arranged in a turbine housing 297 and is coupled to the shaft 37. The fuel cell exhaust gas stream 290 flows through a volute 298 to the turbine wheel 295 and then flows axially out of the wheel. The turbine 29 is in the form of a recovery turbine which uses warm fuel cell exhaust gas to heat other gas streams. Hydrogen from the fuel cell exhaust gas stream 290 can be guided, after passing through the turbine 29, to the fan inlet 251 and conveyed through the fan 25.

In this exemplary embodiment, the impeller 255 and the turbine wheel 295 are arranged back-to-back so that the rear faces thereof face one another. In this exemplary embodiment, the rear faces touch one another. Alternatively, the impeller 255 and the turbine wheel 295 are formed as a single piece. The arrangement of the turbine wheel 295 and impeller 255, which is also referred to as a back-to-back arrangement, allows the construction of a compact recirculation fan turbocharger assembly 23.

Although the impeller 255, the compressor wheel 275 and the turbine wheel 295 are coupled by means of the shaft 37, the gas streams are separated from one another by the fan 25, the turbine 29 and the compressor 27. This is achieved inter alia by the design of the housing of the recirculation fan turbocharger assembly 1 and by seals, in particular in the region of the shaft 37.

The orientation of the wheels, namely the impeller 25, the compressor wheel 275 and optionally the turbine wheel 295, can be selected according to the operating and design requirements. Thus, in FIGS. 3, 5 and 7, an orientation of the wheels with backs facing the electric motor 33 is sketched by way of example. In these exemplary embodiments as well, a back-to-back arrangement of two adjacent wheels would be conceivable. An arrangement as shown in FIG. 8, but in which the fan 25 and the compressor 27 are arranged the other way around so that the compressor wheel 275 and the turbine wheel 295 are arranged back to back, is also possible.

The preceding features, the features indicated in the claims and the features that can be derived from the drawings can advantageously be implemented both individually and in various combinations. The invention is not limited to the described exemplary embodiments, but rather can be modified in various ways within the capabilities of a person skilled in the art.

REFERENCE SIGNS 1 fuel cell unit
3 hydrogen reservoir
5 pressure reducer
7 pressure regulating valve 9 ejector
11 filter
13 air compressor
15 humidifier
17 recirculation fan
19 discharge valve
21 cooling connection
23 recirculation fan turbocharger assembly
25 fan
250 hydrogen containing recycle stream
251 fan inlet
253 fan outlet
255 impeller
257 fan housing
258 volute
27 compressor
270 air stream
271 compressor inlet
273 compressor outlet
275 compressor wheel
277 compressor housing
278 volute
29 turbine
290 fuel cell exhaust gas stream
291 turbine inlet
293 turbine outlet
295 turbine wheel
297 turbine housing
298 volute
31 electric drive
33 electric motor
35 control circuit
37 shaft
39 bearing
41 magnetic region
43 magnetic region
45 stator
47 power output
49 electrical supply

What is claimed is:

1. A recirculation fan turbocharger assembly for a hydrogen recycle and an air supply in a fuel cell system, the recirculation fan turbocharger assembly comprising: a fan having an impeller configured to convey a hydrogen containing recycle stream to a fuel cell unit, a compressor having a compressor wheel configured to compress an air stream for the fuel cell unit, wherein the compressor wheel and the impeller are coupled to one another in a rotationally fixed manner, and an electric drive and a turbine, with both the electric drive and the turbine coupled to the impeller and the compressor wheel to drive the impeller and the compressor wheel simultaneously,
wherein the turbine is configured to be driven by a fuel cell exhaust gas stream, and
wherein the electric drive is configured to electrically assist the turbine in driving the fan and the compressor.

2. The recirculation fan turbocharger assembly according to claim 1,
wherein the turbine comprises a turbine wheel which is coupled to the impeller and the compressor wheel so that a rotation of the turbine wheel is transmitted to the impeller and the compressor wheel.

3. The recirculation fan turbocharger assembly according to claim 2,
further comprising a shaft which is coupled to the impeller, the compressor wheel and the turbine wheel, wherein the electric drive is coupled to the shaft between two of the impeller, the compressor wheel and the turbine wheel.

4. The recirculation fan turbocharger assembly according to claim 3,
wherein an electric motor is arranged between the turbine wheel and the impeller and is coupled to the shaft, and wherein the compressor wheel is arranged on the side of the impeller facing away from the electric motor.

5. The recirculation fan turbocharger assembly according to claim 2,
wherein two of the impeller, the compressor wheel and the turbine wheel each include a rear face and are arranged back-to-back such that the rear faces face each other.

6. A fuel cell system comprising a recirculation fan turbocharger assembly according to claim 1 and a fuel cell unit which are coupled to one another such that hydrogen from the fuel cell unit can be conveyed through the fan back to the fuel cell unit, and an air stream can be supplied through the compressor.

7. The fuel cell system according to claim 6, wherein the fan has a fan inlet and a fan outlet, the compressor has a compressor inlet for the inflow of air and a compressor outlet, and the fuel cell unit is coupled to the fan inlet on an output side of the fuel cell unit and to the fan outlet and the compressor outlet on an input side of the fuel cell unit.

8. The fuel cell system according to claim 6, wherein the fan has a fan inlet and a fan outlet, the compressor has a compressor inlet for the inflow of air and a compressor outlet, the turbine has a turbine inlet and a turbine outlet, and the fuel cell unit is coupled to the turbine inlet and the fan inlet on an output side of the fuel cell unit, and to the fan outlet and the compressor outlet on an input side of the fuel cell unit.

9. The recirculation fan turbocharger assembly according to claim 2,
wherein the impeller and the turbine wheel each include a rear face and are arranged back-to-back such that the rear faces face each other.

10. The recirculation fan turbocharger assembly according to claim 2,
further comprising a shaft which is coupled to the impeller, the compressor wheel and the turbine wheel, wherein the electric drive is coupled to the shaft between the impeller and the turbine wheel, and wherein the compressor wheel is arranged on the side of the impeller facing away from the electric drive.

* * * * *